United States Patent

Swanson et al.

[11] Patent Number: 5,398,151
[45] Date of Patent: Mar. 14, 1995

[54] DISKETTE LINER

[75] Inventors: Leonard R. Swanson, Woodbury; Maurice H. Kuypers, Oakdale; Kevin C. Veenstra, St. Paul, all of Minn.

[73] Assignee: Minnesota Mining and Manufacturing Company, St. Paul, Minn.

[21] Appl. No.: 145,491

[22] Filed: Oct. 29, 1993

[51] Int. Cl.⁶ ............................................. G11B 23/03
[52] U.S. Cl. ...................................................... 360/133
[58] Field of Search ........................................ 360/133

[56] References Cited

U.S. PATENT DOCUMENTS

| | | | |
|---|---|---|---|
| 4,106,067 | 8/1978 | Masuyama et al. | 360/137 |
| 4,470,083 | 9/1984 | Doering et al. | 360/97 |
| 4,586,606 | 5/1986 | Howey | 206/313 |
| 4,610,352 | 9/1986 | Howey et al. | 206/313 |
| 4,655,348 | 4/1987 | Takagi | 206/444 |
| 4,683,165 | 7/1987 | Lindemann et al. | 428/290 |
| 4,702,957 | 10/1987 | Mudge | 428/288 |
| 4,791,516 | 12/1988 | Seto | 360/133 |
| 4,803,584 | 2/1989 | Doi et al. | 360/133 |
| 4,845,583 | 7/1989 | Zimmerman et al. | 360/133 |
| 4,998,176 | 3/1991 | Takemar et al. | 360/133 |
| 5,030,507 | 7/1991 | Mudge et al. | 428/288 |
| 5,060,105 | 10/1991 | Howey | 360/133 |
| 5,122,919 | 6/1992 | Takemae et al. | 360/133 |
| 5,143,954 | 9/1992 | Hutton et al. | 524/106 |
| 5,311,389 | 5/1994 | Howey | 360/133 |

FOREIGN PATENT DOCUMENTS

| | | |
|---|---|---|
| 423395 | 12/1989 | European Pat. Off. . |
| 204313 | 9/1985 | Japan . |
| 152074 | 12/1986 | Japan . |
| 1199371 | 8/1989 | Japan . |

*Primary Examiner*—Robert S. Tupper
*Attorney, Agent, or Firm*—Gary L. Griswold; Waltner N. Kirn; Susan Moeller Zerull

[57] ABSTRACT

A liner for diskettes comprised of a nonwoven material which is thermally bonded in a closed cell pattern and which contains a binder material in amounts no greater than 1% by weight of fibers. This diskette liner shows debris reduction while not showing significant increase in flexural rigidity.

11 Claims, 4 Drawing Sheets ically bonded but contains no latex.

DISKETTE LINER

BACKGROUND

1. Field of the Invention

This invention pertains to magnetic recording diskettes, specifically to a liner or cleaning fabric contained within the shell or jacket of the diskette.

2. Background of the Invention

Magnetic recording diskettes are commonly used for word processing and personal computer applications where relatively inexpensive, random access data storage is desired. These diskettes generally have a flexible disk of magnetic recording material substantially enclosed in a plastic shell. The shell is designed to protect the magnetic recording surface from exposure to contaminants such as dust, smoke, hair and fingerprints which can disrupt the operation of the head. However these contaminants do enter the shell through the access window or the hub opening. To minimize the effect of the contaminants a diskette liner can be placed inside the shell to wipe the disk surface as it rotates.

The liner is typically a soft nonwoven fabric cut to fit the inside of the shell and to allow head access to the recording medium. An effective liner must have the ability to clean the disk surface (remove and hold stray particles and contaminants) while not causing scratching or excessive wear to the disk over millions of revolutions in the drive. Equally important, the liner should not itself be a source of debris that could contribute to the possibility of signal error or loss of data.

Liners are frequently made from nonwoven fibers bonded together with an adhesive binder. Such liners typically contain between 20 and 50% by weight of binder. Unfortunately the binder while improving fabric integrity also stiffens the fabric and can cause scratching of the magnetic layer.

Thermal bonded nonwoven fabrics have been used, but such fabrics either suffer from much higher debris levels or require additional processing steps or multilayer structures. U.S. Pat. No. 4,998,176 (Takemae) and U.S. Pat. No. 5,060,105 (Howey) suggest improving thermal-bonded, nonwoven liners by treating the fabrics with less than 10% and less than 5% binder, respectively. Such treatment is reported to yield diskette liners with decreased debris in comparison to nonwoven liners that were thermally bonded only. The Takemae patent indicates a preference for greater than 1% binder and shows examples only at the 5% binder level. The Takemae patent also teaches that the binder is found primarily in the part of the fabric which is not thermocompression bonded.

The Howey patent teaches a non-woven fabric which is spot welded at the thermal bond points. Howey indicates a preference for binder levels between 1.5 and 3.0% by weight of the fabric and teaches that the binder is found preferentially at the junction points of the fibers. Both the Howey and the Takemae patents show substantial increases in flexural rigidity after the addition of the binder material to the nonwoven fabric.

SUMMARY OF THE INVENTION

The diskette liner of the present invention comprises a non-woven fabric in which the fibers are thermally bonded in a closed cell pattern and which has a small amount of a binder material on the fabric. The amount of binder material should be no more than 1% by weight of fiber. This liner shows a reduction in debris over nonwoven liners that are only thermally bonded, but notwithstanding that reduction, the liner avoids the increase in flexural rigidity that other binder-modified, thermally bonded nonwoven liners have shown.

In another embodiment this invention addresses a diskette comprising a shell, a disk of magnetic recording material, and either one or two non-woven liners, which are thermally bonded in a closed cell pattern and have a small amount of a binder material adhering to the fibers.

DETAILED DESCRIPTION OF THE INVENTION

Figure 1:
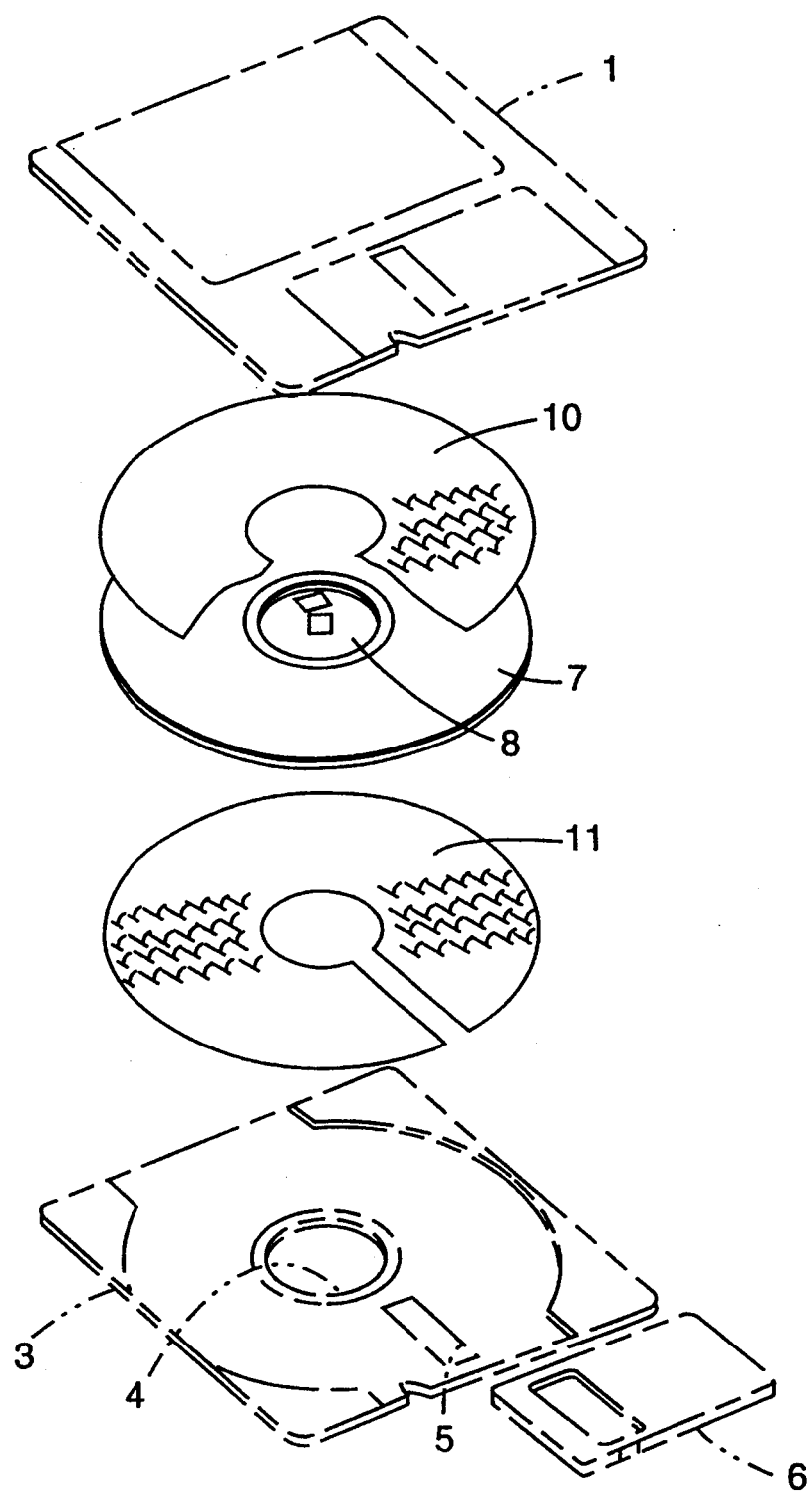
FIG. 1 is an exploded view of a diskette of the present invention.

Referring to FIG. 1, the basic parts of a representative diskette within which the inventive liner may be used are: first shell half 1; second shell half 3 in which there are the center hole 4 and the head access opening 5; shutter 6 which slides to cover the head access opening; magnetic recording medium disk 7 having hub 8; and first and second diskette liners 10 and 11 on both sides of the recording medium disk, and shaped to fit within the inside of the respective diskette shell halves. Although this figure corresponds to a 3.5" diskette, the liners of the present invention may also be used in other diskettes with different configurations.

The diskette liner of the present invention is made of a nonwoven fabric which is able to collect debris and contaminants without causing damage to the magnetic recording disk surface. The nonwoven fabric web used for the liners is a loose matrix of fibers which have been entangled using air laying, hydroentanglement, carding or some similar method known to the art.

The fibers may be rayon, polyester, nylon, acrylic, polypropylene, cotton, wool, a composite fiber or a combination thereof. A composite fiber is a fiber composed of two or more polymers. A bicomponent fiber is a preferred type of composite fiber. A bicomponent fiber, as defined here, has two polymers in a sheath-core type of configuration. Preferably the core is a higher molecular weight polymer which provides strength, while the sheath is of a lower molecular weight polymer for enhanced thermal bonding. Use of some combination of fibers is preferred. The preferred combination is a mix of rayon, polyester, and bicomponent fibers. However, a wide variety of fiber combinations may be used as long as they may be adequately bonded by thermal compression. The fiber length preferably ranges from 1.0 to 2.0 inches (2.5–5.1 cm), however, fibers of various lengths may be used. The loose matrix of fibers is thermally compression bonded in a closed cell pattern, e.g. a network of squares, hexagons, triangles, etc. Preferably 20 to 50%, more preferably 30 to 45%, of the fabric area is thermally bonded. A square pattern with from about 5 to about 30 lines of thermal bonding per inch (1.9–12 lines/cm), preferably approximately 10–20 lines per inch (3.9–7.8 lines/cm), may be used. Use of a closed cell bonding pattern increases the likelihood that every fiber is thermally bonded in at least one spot. In the preferred embodiments, where the number of thermal bond lines is relatively high compared to the fiber length, each fiber is probably bonded at more than one location. The existence of bonding at various locations on a fiber is believed to contribute to debris reduction.

Thermal compression bonding is often achieved by transporting the entangled fibers through an embossing calendar. The calendar is generally composed of two rollers at least one of which is has a raised pattern on it. The entangled fibers are pressed between the rollers at an elevated temperature sufficient to cause the fibers to partially melt and adhere to each other. The web becomes bonded together in the pattern which was on the roller. For this invention the pattern on the roller must be a closed cell pattern.

A closed cell thermal bond pattern alone, however, does not always provide acceptable liner properties. This may be due to such factors as imperfect thermal bonding or fibers which become loose during production of the liner and the diskette. Debris reduction is, thus, further enhanced by inclusion of a binder. Only surprisingly small amounts of binder are required to improve the properties of a closed cell thermally bonded fabric. Use of the closed cell pattern in combination with small amounts of resin binder gives a liner which shows improved processibility, lower stringer counts, and at least comparable debris generation as compared to commercially available liner products. Specifically, the inventive liner generates from 60 to 90% less debris during processing and shows 32% fewer stringers in the read/write access window than a common commercially used liner. Because very little binder is needed to improve liner properties, the liner of the present invention does not experience the significantly increased flexural rigidity noted in Howey and Takemae. According to the present invention the amount of binder used is no more than 1%, and preferably is from 0.5 to 0.8%, by weight of fiber.

The binder is applied after the thermally bonded nonwoven web is cooled. The binder solution may be applied by dipping, spraying, foaming, use of a coater or any similar method. One method that may be used is passing the thermally bonded web between two rollers one of which is partially immersed in the binder solution. The binder solution is transported to the nonwoven web by contact with the partially immersed roller. The other roller exerts pressure on the fabric so that the binder is dispersed throughout the fabric. No preferential distribution of the binder at the fabric junction points or in the portions of the liner which are not thermally bonded is observed. The web is then dried.

While the binder material may be a variety of polymers such as butadiene rubbers, polyvinyl chloride, polyvinyl alcohols, polyvinyl acetates, etc. Acrylic resins are preferred. Suitable acrylic resins preferably have a glass transition temperature under 0° C. A preferred commercially available source for the acrylic resin is the Rohm and Haas E-1845 acrylic polymer emulsion.

EXAMPLES

Example 1

The following fibers were blended by weight as follows:
80% Courtaids Rayon Type 10668 (1.5 d×1 9/16")
20% Hoechst Celanese composite fiber Type K54 (2.0 d×1.5")
The blended fibers were fed into conventional fiber opening and blending equipment manufactured by Hergeth-Hollingsworth. The fibers were carded and laid by a Hergeth-Hollingsworth Random Card to a fiber mass of approximately 35 g/m². The fibers were processed through a two roll vertical stack B. F. Perkins thermal bonding calendar. The top calendar roll had a closed cell rectangular bond pattern. The bottom roll was smooth. Heated oil was circulated through the calendar to provide a surface temperature of about 280° F. Pressure was applied to the web through the calendar rolls.

The thermally bonded web was processed through a two roll rotogravure station where a synthetic latex binder was applied. The following latexes were used: Rohm & Haas E-1847, E-2559, and NW-1715 (all are acrylic latexes), National Starch E-646 (ethylene vinyl acetate latex), and B. F. Goodrich 26120 (acrylic latex) and 1800×73 (styrene butadiene rubber latex). Each latex was diluted with water to 1% solids by weight. The amount of total solution applied was controlled by the choice of the engraved pattern on the gravure roll and by the pressure applied by two rollers through which the nonwoven web was passed. The web was dried and the resin was cured by processing through a hot air impingement oven.

Example 2 and Comparative Example 1

Three nonwoven fabric types prepared according to the process described in Example 1 were tested for flexural rigidity according to ASTM D1388-64, "Standard Test Methods for Stiffness of Fabrics, Option A—Cantilever Test." At least five 1"×6" specimens of each fabric type were tested on each end of the specimen. The fibers in all the samples were a blend of 55 weight % Courtaulds rayon Type 10668, 25% Hoechst-Celanese polyethylene terephthalate Type 127, and 20% Hoechst Celanese bicomponent type K-54. The bond pattern was rectangular with about 20 lines/inch (7.8 lines/cm), yielding about 36% of the area being thermally bonded. Comparative Example 1 was thermally bonded only while Example 2 was additionally coated with Rohm & Haas Emulsion E-1845 in the amount 0.7 wt % by weight of dry fibers. The samples were also tested for debris by measuring the weight of a 4.5"×3' web, passing the web across a vacuum system, and re-measuring the weight of the web. The samples were further tested for tensile strength. The tensile test was based upon PSTC-31, ASTM D882 and D3759. The results are shown in Table 1.

TABLE 1

|  | Comparative Example 1 | Example 2 |
| --- | --- | --- |
| Flexural Rigidity |  |  |
| (mg-cm) | 109 | 107 |
| % change | — | −1.8% |
| Debris |  |  |
| % by wt of sample | .0921% | .0863% |
| % change | — | −6.33% |
| Tensile MD |  |  |
| (lb/in) | 2.63 | 2.34 |

Example 3

Photomicrographs were taken of thermal compression bonded liners composed of 55 weight % rayon, 25% polyethylene terephthalate, and 20% Hoechst Celanese bicomponent type K-54. The liners with 0.7%

Figure 2:
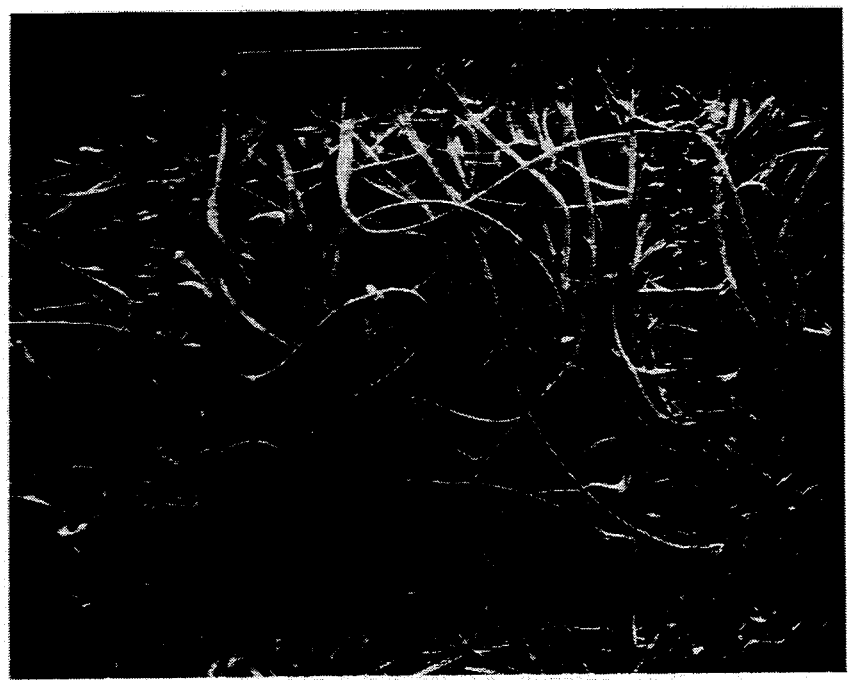
FIGS. 2–4 are photomicrographs of the liner fabric of the present invention.
Figure 3:
Figure 4:
Figure 5:
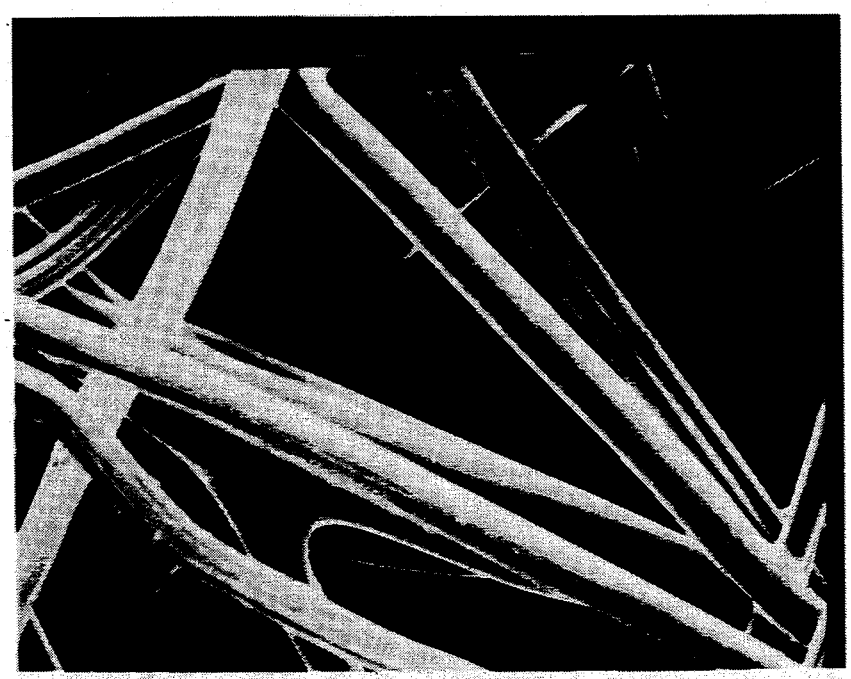
FIGS. 5–6 are photomicrographs of fabric which is thermally bonded but contains no latex.
Figure 6:

(by weight of fibers) Rohm & Haas E-1845 binder are shown in FIGS. 2 (55× magnification), 3 (450× magnified view of nonthermally bonded portion of liner), and 4 (200× magnified view of thermal bonded portion of the liner). FIGS. 5 (50× magnification) and 6 (450× magnification of nonthermally bonded portion of the liner without binder) are photomicrographs of the liner without binder. No preferential placement of the binder is seen at either the junction points of fibers, the thermally bonded portion of the liner, or the non-thermal bonded portion of the liner.

Comparative Examples 2-10 and Examples 4-8 demonstrated the best processibility in general, with a maximum of 0.8% processing rejects and no process down time. The inventive liners also had fewer stringers appearing in the head access slot and those that were visible were shorter. The debris observed was fairly consistent for the point bonded and the closed cell bonded liners and was comparable to the debris observed from a Veratec 9245 liner. The amount of debris did increase when no latex was used. While the closed-cell bonded liners were ranked as more abrasive than the Veratec liner and the point bonded liners, the abrasivity was not such that the liner would cause significant wear on the recording media surface.

TABLE 2

| Ex. # | Fibers | Bond Pattern | Latex | Tensile Strength (lb/in) | % Processing Rejects | # stringers counted in head access slot | Avg. stringer lgth. (in.) | Rank of samples by Abrasivity (1-softest) | Vibrac Torque (g-cm) | Debris in shell, on media |
|---|---|---|---|---|---|---|---|---|---|---|
| Comp. 2 | 80% R/20% B | Point | E-646 | 2.51 | 0.4 | 0 | 0 | 7 | 91 | 1 |
| Comp. 3 | 50% R/30% P/20% B | Point | E-646 | 3.05 | 6.4 | 3 | .12 | 4 | 94.9 | 1 |
| 4 | 80% R/20% B | Rectangle | E-646 | 1.76 | 0.2 | 0 | 0 | 13 | 19.3 | 1 |
| 5 | 50% R/30% P/20% B | Rectangle | E-646 | 2.38 | 0.6 | 0 | 0 | 12 | 25.5 | 1 |
| Comp. 4 | 80% R/20% B | Point | E-1847 | 3.15 | 3.2 | 3 | .12 | 6 | 70 | 3 |
| Comp. 5 | 50% R/30% P/20% B | Point | E-1847 | 3.45 | 5.4 | 9 | .18 | 5 | 77.2 | 2 |
| 7 | 80% R/20% B | Rectangle | E-1847 | 1.86 | 0.6 | 2 | .03 | 9 | 19.3 | 3 |
| 8 | 50% R/30% P/20% B | Rectangle | E-1847 | 3.14 | 0.8 | 3 | .06 | 8 | 30.4 | 2 |
| Comp. 6 | 80% R/20% B | Point | — | — | 3.7 | 10 | .12 | 2 | 68 | 8 |
| Comp. 7 | 50% R/30% P/20% B | Point | — | — | Would not cut | — | — | 1 | — | — |
| Comp. 8 | 80% R/20% P | Rectangle | — | — | 0.6 | 5 | .12 | 11 | 29.2 | 5 |
| Comp. 9 | 50% R/30% P/20% B | Rectangle | — | — | 0.2 | 9 | .12 | 10 | 30.9 | 8 |
| Comp. 10 | Veratec 9245 | — | — | — | 2.5 | 9 | .12 | 2 | 17.7 | 2 |

R = Courtaulds Rayon 10668
P = Hoechst Celanese L-30 (polyester)
B = Hoechst Celanese K-4 (bicomponent fiber)
E-646 - (National Starch EVA latex 1% solids)
E-1847 - (Rohm & Haas Acrylic latex 1% solids)
*These fabrics caused assembler down time Twelve fabric types were prepared by the method described in Example 1. Those fabrics with binder had less than 1% binder by weight of fiber. In addition a commercial fabric, Veratec 9245, which has been used commercially as a diskette liner, was tested in comparison. The fabrics were evaluated for tensile strength. Liners were produced using the various fabrics. Ease of processing was evaluated by the number of processing rejects. In addition, certain of the tested fabrics caused process downtime due to jamming of the processing equipment, etc. The number and length of stringers observed in the read/write access window was recorded. Some diskettes were opened and the amount of debris observed in the shell and on the media was recorded. The torque required to turn the media within the shell (Vibrac Torque) without recording heads being loaded was noted. A lower torque valve is preferred. In addition, the liner fabrics ranked according to abrasivity. This was accomplished by visually observing the recording medium after 10 million passes in a disk drive. The results are shown in Table 2. The liners of the present invention, which are closed-cell thermally bonded and coated with low amounts of latex Comparative Examples 11 and 12 and Example 9

Additional fabric was produced with a thermally bonded cross-hatch or rectangular pattern Rohm and Haas Acrylic Latex E-1845 was used in amounts of about 0.65% by weight of dry fiber in Example 9. This was accomplished by using a latex that was 1.3% solids and having a 50% pick up in the rotogravure process. Comparative Example 11 had no binder. The results are shown in Table 3. Example 9, which is an embodiment of the inventive liner, provided the best results, showing fewer processing rejects, less debris and stringers, and lower torque requirements than a sample without latex, Comparative 11 and a sample of a commercially used liner, Comparative 12.

TABLE 3

| Ex. # | Fibers | Tensile Strength (lb/in) | % Processing Rejects | # Stringers/debris particles observed | Vibrac Torque (g-cm) |
|---|---|---|---|---|---|
| 9 | 55% R/25% P/20% B | 2.70 | 0.06 | 11.8 | 18.3 |
| Comp. 11 | 55% R/25% P/20% B | 2.84 | — | 72.6 | 20.4 |
| Comp. 12 | Veratec 9245 | — | 0.24 | 37.2 | 20.6 |

What is claimed is:

1. A diskette comprising a shell, a disk of magnetic recording material inside the shell, and at least one diskette liner between the shell and the magnetic recording material, said diskette liner comprising a nonwoven fabric in which the fibers are thermally bonded in a closed cell pattern and which includes a binder material in amounts no greater than 1% by weight of the fibers.

2. The diskette of claim 1 in which from 30% to 45% of the liner fabric is thermally bonded.

3. The diskette of claim 1 in which the fiber for the liner fabric is selected from the group consisting of rayon, acrylic, polyester, nylon, polypropylene, composite fibers, cotton, wool, or combinations thereof.

4. The diskette of claim 1 in which the binder material for the liner fabric is selected from the group consisting of vinyl acetate polymer, acrylic polymers, vinyl chloride polymers, nitrile rubbers, styrene butadiene copolymers, and polyvinyl alcohol.

5. The diskette of claim 1 in which the amount of binder on the liner fabric is from 0.5 to 0.8% by weight of fiber.

6. The diskette of claim 3 in which the fibers are a blend of rayon, polyester, and a sheath-core bicomponent fiber.

7. The diskette of claim 1 in which the closed cell pattern on the liner fabric has from 5 to 30 lines per inch.

8. The diskette of claim 1 in which the fibers in the liner fabric are from 1 to 2 inches long.

9. The diskette of claim 1 in which the binder on the liner fabric is an acrylic polymer.

10. The diskette of claim 9 in which the acrylic polymer has a glass transition temperature of less than 0° C.

11. The diskette of claim 1 in which the closed cell pattern in the nonwoven fabric is a rectangular pattern.

* * * * *

UNITED STATES PATENT AND TRADEMARK OFFICE
CERTIFICATE OF CORRECTION

PATENT NO. : 5,398,151
DATED : Mar. 14, 1995
INVENTOR(S) : Swanson et al.

It is certified that error appears in the above-indentified patent and that said Letters Patent is hereby corrected as shown below:

On the title page, under "Attorney, Agent, or Firm", delete "Waltner" and insert --Walter--.

Column 3, line 64, delete "Courtaids" and insert --Courtalds--.

Signed and Sealed this

Fifth Day of September, 1995

Attest:

BRUCE LEHMAN

Attesting Officer

Commissioner of Patents and Trademarks